3,639,597
PHARMACEUTICAL COMPOSITIONS CONTAINING CHOLANIC ACID CONJUGATES
John Hannah, Matawan, N.J., assignor to Merck & Co., Inc., Rahway, N.J.
No Drawing. Filed Feb. 2, 1968, Ser. No. 702,509
Int. Cl. A61k 27/00
U.S. Cl. 424—238                    12 Claims

ABSTRACT OF THE DISCLOSURE

Pharmaceutical compositions comprising a 5β-glycocholanic acid or 5β-taurocholanic acid as the active ingredient. The compositions reduce plasma cholesterol and triglyceride levels in blood serum and, therefore, are useful in the treatment of conditions associated with atherosclerosis.

---

This invention relates to novel pharmaceutical compositions which are useful as hypolipemics and hypocholesterolemics and to methods of using same.

There is no clear agreement about the actual role of plasma lipids in the localization of atherosclerotic plaques but numerous studies support the concept that lipids play a major role in the pathogenesis of atherosclerosis because along with fibrin they accumulate in the arterial intima and subintima and produce arterial corrosion.

Cholesterol and triglycerides are typical of the many lipids which are present to some extent in all ordinary diets. Such lipids are known to be synthesized in the body from intermediates of metabolic origin and, therefore, it has long been desired to develop a chemotherapeutic composition which would effect a reduction in cholesterol and triglyceride levels. It has now been found in tests on mice that the instant compositions exhibit surprisingly good inhibitory effects on the level of cholesterol in blood serum without inducing significant weight loss or any other of the contraindications sometimes associated with hypolipemic and hypocholesterolemic activity. Also, in tests on rats and dogs the instant compositions effect a strikingly good triglyceride-lowering response. Groups of male rats fed a diet containing 0.0081% and 0.025% by weight of the instant ingredients show a reduction in plasma triglyceride levels which is several times greater than that which can be obtained with other analogous compounds. This ability to effectively reduce triglyceride and cholesterol levels in serum bespeaks their usefulness as hypolipemic and hypocholesterolemic agents and augurs well for their application in the treatment of conditions associated with atherosclerosis.

The compositions of this invention contain as the active ingredient a 5β-glycocholanic acid or 5β-taurocholanic acid having the following general formula:

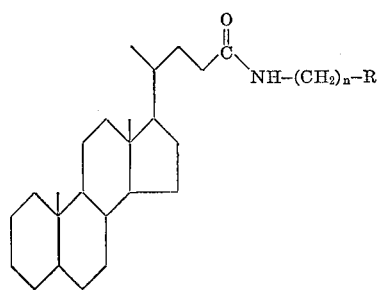

(I)

wherein R is carboxy when $n$ has a value of one, or sulfo, i.e., —$SO_3H$, when $n$ has a value of two; and the nontoxic pharmacologically acceptable salts of the said acids as, for example, the alkali metal and alkaline earth metal salts such as the sodium, potassium or calcium salts, etc. The foregoing (I) are effective hypolipemic agents; they reduce the concentration of cholesterol in mice and in tests on rats and dogs they bring about a significant reduction in the concentration of triglycerides in blood serum. Typical of the products (I) embraced by this invention are 5β - glycocholanic acid, 5β-taurocholanic acid and the alkali metal and alkaline earth metal salts thereof as, for example, the sodium, potassium and calcium salts.

The active ingredients (I) of this invention may be admixed with any nontoxic pharmaceutically acceptable carrier or diluent in any one of a variety of compositions as, for example, in capsules, tablets, powders or liquid solutions or as suspensions or elixirs and may be administered orally, intravenously or intramuscularly. Suitable carriers which may be used in the compositions include, for example, mannitol, sucrose, glucose or sterile liquids such as water, saline, glycols and oils of a petroleum, animal, vegetable or synthetic origin as, for example, peanut oil, mineral oil and sesame oil. Also, in addition to a carrier, the instant compositions may also include other ingredients such as stabilizers, binders, anti-oxidants, preservatives, lubricators, suspending agents, viscosity aids, flavoring agents and the like.

There may also be included in the composition other active ingredients to provide a broad spectrum of activity. Thus, for example, in the treatment of hyperchloesterolemia, a commonly encountered complication is the occurrence of edema and/or obesity which may be treated by including within the hypocholesterolemic composition an appropriate diuretic and/or anorectic. The type and amount of such additional ingredients to be included within the composition will depend largely upon the malady to be treated and, therefore, these features can be easily determined by those skilled in the art.

The dosage to be administered depends to a large extent upon the condition being treated and the weight of the subject. In general, however, a daily dosage consists of from about 0.5 to about 500 mg. of active ingredient per kilogram of body weight of the subject to be treated in one or more applications per day. A preferred daily dosage lies in the range of from about 5 to 15 mg. of active ingredient per kilogram of body weight.

The instant compositions may be administered in several unit dosage forms as, for example, in solid or liquid orally ingestible dosage forms, in which case the active ingredient is admixed with an orally ingestible pharmaceutically acceptable solid or liquid such as mannitol, sorbitol, sucrose, calcium phosphate or potable water or a vegetable oil such as peanut oil or with sesame oil, corn oil or with alcohol and the like. The compositions, per unit dosage, whether liquid or solid, will generally contain from about 10 mg. to about 500 mg. by weight of the active drug based on the total weight of the composition and depending upon the type of formulation desired. However, a range of from about 35–350 mg. is preferably employed. In addition, the compositions may also include other ingredients such as stabilizers, binders, antioxidants, preservatives, lubricators, suspending agents, viscosity aids, flavoring agents and the like.

Another suitable formulation is a chewable tablet in which the 5β-glycocholanic acid or 5β-taurocholanic acid (I) is present to the extent of from about 10 mg. to about 500 mg. by weight and preferably from 35-350 mg. by weight in a pharmaceutically acceptable orally ingestible solid carrier together with a gum base. Again, if desired, the composition may also contain flavors, binders, lubricants and other excipients known in the art. Tablets suitable for chewing should weigh, in general from 250 mg. to 2.0 grams and should contain approximately 35-350 mg. of active ingredient. Tablets desired for swalling rather than chewing may be prepared by employing proportionately smaller amounts of ingredients.

Another route for oral administration is in the form of a soft gelatin capsule. Such compositions may contain from 35-350 mg. by weight of active ingredient dissolved or suspended in a pharmaceutically acceptable oil such as those mentioned above or in alcohol, glycerine, water or the like. Alternatively, a hard gelatin capsule formulation may be prepared by admixing 35-350 mg. by weight of active ingredient with pharmaceutically acceptable ingredients. Thus, by mixing 100 mg. of a 5$\beta$-glycocholanic acid or 5$\beta$-taurocholanic acid (I) or a suitable salt thereof with 144 mg. of lactose and 6 mg. of magnesium stearate and placing the 250 mg. mixture into a No. 3 gelatin capsule a suitable unit dosage capsule may be obtained. Similarly, by employing more of the active ingredient and less lactose other dosage forms can be put up in No. 3 gelatin capsules and, should it be necessary to mix more than 250 mg. of ingredients together, larger capsules may be employed.

The active ingredient may also be formulated as a liquid solution or suspension or as a dry powder, the latter to be used in drinking water, fruit juice, vegetable juice and the like. For orally administerable liquids, aqueous solutions of the active ingredient in the form of its salt is preferred at concentrations of from about 1-5% (w./v.). Also, preservatives, flavoring agents and the like may be added and, if desired, alcohol may be added to provide elixir type formulations.

With regard to the preparation of dry powders containing the active ingredient in a water-insoluble form, the composition should contain a minor amount of a suspending agent to aid in the suspension of the material. Also, if desired, a flavoring agent such as a sugar and a preservative may be employed.

The following examples illustrate the preparation of representative dosage forms containing a 5$\beta$-glycocholanic acid, 5$\beta$-taurocholanic acid product (I) or the salts thereof as active ingredient. However, the examples are illustrative only and those skilled in the art will appreciate that in practice the dose to be administered will depend upon the disease to be treated, upon the age, health and weight of the patient, upon the extent of cholesterol and triglyceride concentration in the subject, upon the frequency of treatment and upon the nature of concurrent treatment if any.

EXAMPLE 1

Dry-filled capsule

A dry-filled capsule is prepared from the following ingredients:

| | Per capsule, mg. |
|---|---|
| 5$\beta$-taurocholanic acid | 100 |
| Lactose | 144 |
| Magnesium stearate | 6 |
| Capsule size No. 3 | 250 |

The 5$\beta$-taurocholanic acid is reduced to a No. 60 powder and lactose and magnesium stearate are then passed through a No. 60 bolting cloth onto the powder and the combined ingredients admixed for ten minutes and filled into a No. 3 gelatin capsule.

By substituting 5$\beta$-glycocholanic acid for the 5$\beta$-taurocholanic acid in the foregoing formulation a 250 mg. dry-filled capsule containing 5$\beta$-glycocholanic acid as the acetive ingredient is obtained.

EXAMPLE 2

Gelatin capsule

A soft elastic gelatin capsule is prepared from the following ingredients:

| | Mg. |
|---|---|
| 5$\beta$-taurocholanic acid | 100 |
| Wheat germ oil | 50 |
| Sunflower seed oil | 100 |
| | 250 |

The 5$\beta$-taurocholanic acid and wheat germ oil are dissolved in sunflower seed oil. The solution then is poured into gelatin capsules which are suitable for oral administration.

The wheat germ oil and sunflower seed oil may be replaced by an equal amount of peanut oil or dimethylacetamide to obtain like capsules which are also suitable for oral administration.

By substituting 5$\beta$-glycocholanic acid for the 5$\beta$-taurocholanic acid in the foregoing formulation a 250 mg. gelatin capsule containing 5$\beta$-glycocholanic acid as the active ingredient is obtained.

EXAMPLE 3

Compressed tablet

A tablet suitable for swallowing is prepared from the following ingredients:

| | Mg. |
|---|---|
| 5$\beta$-glycocholanic acid | 100 |
| Maize starch | 30 |
| Alginic acid | 15 |
| Magnesium stearate | 5 |
| | 150 |

A mixture of 5$\beta$-glycocholanic acid, maize starch, alginic acid and magnesium stearate (2.5 mg.) is compressed into slugs which are then broken into granules. The granules are sifted through an 8 mesh screen and additional magnesium stearate (2.5 mg.) is added. The mixture is then compressed into tablets suitable for oral administration.

By substituting 5$\beta$-taurocholanic acid for the 5$\beta$-glycocholanic acid in the foregoing formulation method a 150 mg. compressed tablet containing 5$\beta$-taurocholanic acid as the active ingredient is obtained.

EXAMPLE 4

Suspension for oral use

A suitable suspension for oral use is prepared from the following ingredients:

5$\beta$-glycocholanic acid—100 mg.
Gum acacia—5 mg.
Sorbic acid—10 mg.
Tragacanth—1 mg.
Sorbitol solution (U.S.P.) 70%—2 ml.
Purified water U.S.P.—q.s. (i.e., a sufficient quantity)
Flavors, as desired—5 ml.

A mixture of 5$\beta$-glycocholanic acid and gum acacia is added to the thoroughly triturated mixture is added slowly with stirring a solution of the sorbic acid and sorbitol solution in water. Following the incorporation of a suitable flavoring agent, if desired, the mixture is homogenized by passage through a conventional homogenizer and there is thus obtained an emulsion suitable for oral administration.

By substituting 5$\beta$-taurocholanic acid for the 5$\beta$-glycocholanic acid in the foregoing formulation a 5 ml. solution for oral use containing 5$\beta$-taurocholanic acid as the active ingredient is obtained.

It will be apparent from the foregoing that the instant invention constitutes a valuable contribution to the search for an effective hypocholesterolemic and it should also be understood that the compositions described in the above examples are merely illustrative and are capable of wide variation and modification without departing from the spirit of this invention.

What is claimed is:

1. A pharmaceutical composition useful in the treatment of hypercholesterolemia and hyperlipemia comprising as the active ingredient from 0.5–500 mg. of a compound having the formula:

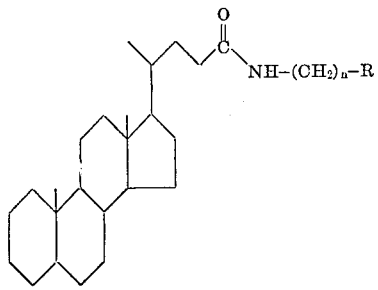

wherein R is carboxy when $n$ has a value of one or sulfo when $n$ has a value of two, and the nontoxic pharmacologically acceptable salts of the said acids, with a nontoxic pharmaceutically acceptable carrier.

2. A composition according to claim 1 wherein the active ingredient is 5$\beta$-glycocholanic acid. cholanic acid.

3. A composition according to claim 1 wherein the active nigredient is 5$\beta$-glycocholanic acid.

4. A composition according to claim 1 comprising 5$\beta$-glycocholanic acid in sterile water.

5. A composition according to claim 1 wherein the active ingredient is 5$\beta$-glycocholanic acid.

6. A method for the treatment of hypercholesterolemia and hyperlipemia which comprises administering from 0.5–500 mg. of a pharmaceutical composition comprising a compound having the formula:

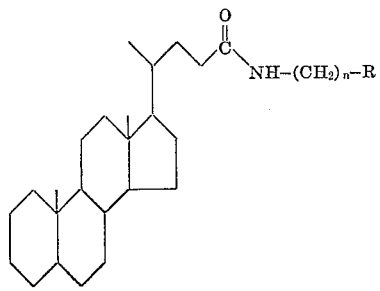

wherein R is carboxy when $n$ has a value of one or sulfo when $n$ has a value of two, and the nontoxic pharmacologically acceptable salts of the said acids, with a nontoxic pharmaceutically acceptable carrier.

7. A method according to claim 6 wherein the active ingredient is 5$\beta$-glycocholanic acid or 5$\beta$-taurocholanic acid.

8. A method according to claim 6 wherein the active ingredient is present in the amount of from 5–15 mg./kg. of body weight.

9. A method according to claim 6 wherein the active ingredient is 5$\beta$-glycocholanic acid.

10. A method according to claim 6 wherein the active ingredient is 5$\beta$-taurocholanic acid.

11. A method according to claim 6 wherein the active ingredient is present in the amount of from 5–15 mg./kg. of body weight of 5$\beta$-glycocholanic acid or 5$\beta$-taurocholanic acid in tablet form.

12. A method according to claim 6 wherein the active ingredient is present in the amount of from 5–15 mg./kg. of body weight of 5$\beta$-glycocholanic acid or 5$\beta$-taurochloranic acid in capsule form.

References Cited

Chem. Abst.—vol. 48—1954—page 13004b.
Chem. Abst.—vol. 58—1963—page 7204g.

SAM ROSEN, Primary Examiner